（12）United States Patent
Rhee et al.

(10) Patent No.: US 11,840,882 B2
(45) Date of Patent: Dec. 12, 2023

(54) WATER-BLOCKING DEVICE (71) Applicant: Korea Institute of Civil Engineering and Building Technology, Goyang-si (KR)

(72) Inventors: Dong Sop Rhee, Paju-si (KR); Hyung Jun Kim, Goyang-si (KR)

(73) Assignee: Korea Institute of Civil Engineering and Building Technology, Goyang-si (KR)

( * ) Notice: Subject to any disclaimer, the term of this patent is extended or adjusted under 35 U.S.C. 154(b) by 521 days.

(21) Appl. No.: 17/257,303

(22) PCT Filed: Apr. 3, 2020

(86) PCT No.: PCT/KR2020/004592
§ 371 (c)(1),
(2) Date: Dec. 31, 2020

(87) PCT Pub. No.: WO2020/204666
PCT Pub. Date: Oct. 8, 2020

(65) Prior Publication Data
US 2021/0230935 A1 Jul. 29, 2021

(30) Foreign Application Priority Data

Apr. 3, 2019 (KR) .................. 10-2019-0039063
Apr. 3, 2019 (KR) .................. 10-2019-0039064

(51) Int. Cl.
*E04H 9/14* (2006.01)
*E06B 9/00* (2006.01)
(Continued)

(52) U.S. Cl.
CPC ............... *E06B 9/00* (2013.01); *E04H 9/145* (2013.01); *E05F 15/71* (2015.01); *E06B 7/06* (2013.01);
(Continued)

(58) Field of Classification Search
CPC ...... E06B 9/00; E06B 17/16; E06B 2009/007; E06B 2009/6818; E05F 15/71;
(Continued)

(56) References Cited

U.S. PATENT DOCUMENTS 2,667,748 A * 2/1954 Heath .................. E02B 7/205
405/92
4,310,262 A * 1/1982 Calza .................. E02B 7/005
405/91
(Continued)

FOREIGN PATENT DOCUMENTS

JP 2003-147752 5/2003
JP 2006-207177 8/2006
(Continued)

OTHER PUBLICATIONS

International Search Report and the Written Opinion dated Jul. 9, 2020 From the International Searching Authority Re. Application No. PCT/KR2020/004592 and Its Translation of Search Report Into English. (9 Pages).
(Continued)

*Primary Examiner* — Benjamin F Fiorello (57) ABSTRACT

The present disclosure provides a water-blocking device including a water-blocking plate installed on a floor of a passage, rails installed on both sidewalls of the floor, and a driving part configured to lift and lower the water-blocking plate, wherein, when the driving part is operated, the water-blocking plate is lifted and lowered along the rails.

15 Claims, 8 Drawing Sheets

(51) Int. Cl.
    *E05F 15/71* (2015.01)
    *E06B 7/06* (2006.01)
    *E06B 9/68* (2006.01)

(52) U.S. Cl.
    CPC . *E06B 2009/007* (2013.01); *E06B 2009/6818* (2013.01)

(58) Field of Classification Search
    CPC ......... E04H 9/145; E02B 13/02; E02B 7/205; E02B 7/28; E02B 7/30; E02B 7/36; E02B 7/46
    See application file for complete search history.

(56) References Cited

U.S. PATENT DOCUMENTS

| | | | | |
|---|---|---|---|---|
| 4,314,774 A | * | 2/1982 | Tsuji | E02B 7/005 |
| | | | | 405/91 |
| 8,246,272 B1 | * | 8/2012 | Heitz | E06B 9/04 |
| | | | | 405/105 |
| 10,309,151 B2 | * | 6/2019 | Tseng | E05D 15/56 |
| 2009/0252557 A1 | * | 10/2009 | Fisher | E06B 9/02 |
| | | | | 405/107 |
| 2012/0005960 A1 | * | 1/2012 | Tseng | E06B 9/0638 |
| | | | | 49/404 |
| 2012/0034032 A1 | * | 2/2012 | Waters, Jr. | E02B 3/104 |
| | | | | 405/92 |
| 2014/0140770 A1 | * | 5/2014 | Nakayasu | E02B 7/40 |
| | | | | 405/107 |
| 2022/0267976 A1 | * | 8/2022 | Aughton | E02B 13/02 |
| 2022/0283002 A1 | * | 9/2022 | Marelli | G01F 1/661 |

FOREIGN PATENT DOCUMENTS

| | | |
|---|---|---|
| JP | 2014-190129 | 10/2014 |
| JP | 2016-089569 | 5/2016 |
| KR | 2004-0071475 | 8/2004 |
| KR | 10-1662784 | 10/2016 |
| KR | 10-2036732 | 10/2019 |
| KR | 10-2036733 | 10/2019 |
| WO | WO 2020/204666 | 10/2020 |

OTHER PUBLICATIONS

Notice of Reasons for Refusal dated Nov. 30, 2021 From the Japan Patent Office Re. Application No. 2021-500160. (3 Pages).

* cited by examiner

WATER-BLOCKING DEVICE

RELATED APPLICATIONS

This application is a National Phase of PCT Patent Application No. PCT/KR2020/004592 having International filing date of Apr. 3, 2020, which claims the benefit of priority of Korean Patent Applications Nos. 10-2019-0039063 and 10-2019-0039064 both filed on Apr. 3, 2019. The contents of the above applications are all incorporated by reference as if fully set forth herein in their entirety.

FIELD AND BACKGROUND OF THE INVENTION

Embodiments herein relate to a water-blocking device, and more particularly, to a water-blocking device having a structure that is buried in a floor at ordinary times and is able to be lifted and lowered along a wall of a passageway.

Generally, water barrier devices or water-blocking devices for entrances are installed at the entrance to a building to prevent water from entering the building and are mostly installed at entrances to buildings in frequently flooded areas where drainage is not smooth and flooding is prone to occur during a localized downpour.

Every year during the rainy season, people living or working in low-lying areas, which are typical areas that are frequently flooded, such as dense residential areas, underground houses, underground shopping centers, and factories, live with concern about flood damage due to localized downpours.

In addition, frontage roads are roads that are closely connected to daily lives of local residents, and are sometimes referred to as access roads in cities. Since the frontage roads are usually narrow in width and are closely connected to the daily lives of local residents, flood damage habitually occurs due to rainwater entering the frontage roads from major arterial roads around July and August during the flood season in summer when localized downpours occur. This causes great property loss or casualties.

In particular, due to the nature of Korea's climate, localized downpours during the flood season in summer have caused great flood damage, and in recent years, due to increased urbanization through large-scale residential site development, road construction, or the like without detailed urban planning, there has been concern about unexpected damage due to a large change in the concentration of water, and as a countermeasure for this, residents of low-lying dense residential areas or areas adjacent to frontage roads have installed water-blocking devices at entrances to buildings as part of a measure to prevent flood damage at an early stage.

However, with regards to the conventional water-blocking device, since fixed posts are semi-permanently fixed to both sidewalls of a building entrance, the fixed posts are inevitably left without being removed even during periods other than periods during which flood damage is expected to occur. The fixed posts left at the building entrance even at ordinary times are not only undesirable in terms of aesthetics but also openly reveal that flood damage is expected to occur to the building at which the fixed posts are installed. Thus, the fixed posts may act as a factor that decreases the price of the building.

In recent years, in order to address the problems due to the fixed posts, Korean Patent Registration No. 1173304 (Aug. 6, 2012) has disclosed a water-blocking device with an improved form that allows the water-blocking device to be installed easily and stably using a pressing method without requiring the fixed posts, which are undesirable in terms of aesthetics, to be fixed at all times to both sidewalls of a building entrance.

The water-blocking device disclosed in Korean Patent Registration No. 1173304 includes a main body panel that is stood upright across a building entrance, a pair of expansion panels installed to be displaceable in left and right directions from left and right sides of the main body panel to expand a horizontal width, and a pushing member installed on a front surface of the main body panel to push the expansion panels so that the expansion panels are pressed against both sidewalls of the building entrance. The water-blocking device can be installed easily and stably using the pressing method without requiring the fixed posts, which are undesirable in terms of aesthetics, to be fixed at all times to both sidewalls of the building entrance, and due to the leverage effect, it is possible to press the expansion panels against both sidewalls of the building entrance with a strong force. Thus, as compared to the conventional water-blocking device, there are various advantages in that high watertightness is secured and the water-blocking device is able to stably withstand water pressure that acts on the front surface thereof.

However, the water-blocking device according to the related art has a problem in that it is very inconvenient to use because the water-blocking device is just a temporary facility that should be installed one by one by a worker when water blocking is required.

SUMMARY OF THE INVENTION

Embodiments herein are directed to providing a water-blocking device that is automatically installable according to an amount of inflow of rainwater or a state of flooding.

Embodiments herein are also directed to providing a water-blocking device that is able to be lifted and lowered according to a height of flooding water.

It should be noted that objects of the present disclosure are not limited to the above-mentioned objects, and other unmentioned objects of the present disclosure will be apparent to those skilled in the art from the following descriptions.

Technical Solution

An embodiment of the present disclosure provides a water-blocking device including a water-blocking plate installed on a floor of a passage, rails installed on both sidewalls of the floor, and a driving part configured to lift and lower the water-blocking plate, wherein, when the driving part is operated, the water-blocking plate is lifted and lowered along the rails.

Preferably, the driving part may be installed on the floor or the sidewall.

Preferably, the water-blocking device may further include a water level indicator configured to sense a water level and a controller configured to receive information on the water level sensed by the water level indicator and control the operation of the driving part to control a height of the water-blocking plate.

Preferably, the water-blocking plate may be provided to have a structure in which a plurality of support frames are connected.

Preferably, the support frame may include a coupling part that protrudes in an axial direction, and the coupling part may be connected through a chain.

Preferably, the support frame may be connected through a connecting part made of an elastic material.

Preferably, the support frame may have a pair of insertion holes formed therein to face each other, and the connecting part may have a connecting body and insertion parts that are inserted into the insertion holes and disposed at each end portion of the connecting body to be inserted into different support frames.

Preferably, at least one protruding part may be provided between the insertion parts of the connecting part.

Preferably, the support frame disposed to face the protruding part may have an inclined or curved surface.

Preferably, a waterproof member may be connected to one surface of the support frame.

Another embodiment of the present disclosure provides a water-blocking device including a water-blocking plate disposed on a floor, a guide part configured to guide movement of the water-blocking plate, and a driving part configured to move the water-blocking plate along the guide part, wherein the water-blocking plate includes a body part in which a plurality of plates are rotatably connected and an elastic member disposed to surround an outer side surface of the body part.

Preferably, the body part may be formed by connection of the plates that each include at least two or more groove parts and at least two or more protrusion parts, the protrusion parts of the plate may be disposed in the groove parts of a neighboring plate, and the body part may include a rotating shaft that passes through the protrusion parts and the plate having the groove parts formed therein.

Preferably, the driving part may include a driving motor and a connecting part connected to the driving motor to lift and lower the water-blocking plate.

Preferably, the guide part may be provided as a pair of groove structures that face each other, and a sealing member may be provided at end portions of the guide parts.

Preferably, the elastic member may be provided to have a free end structure.

Preferably, the water-blocking plate may be disposed to be inserted into an insertion groove formed in the floor and may be lifted and lowered through driving of the driving part.

Preferably, an opening-closing part that is rotatable may be provided at an end portion of the insertion groove.

Preferably, an end portion of the opening-closing part may have an inclined or curved structure.

Preferably, the body part and the elastic member may be coupled through a coupling part.

According to an embodiment, flooding water can be blocked without requiring a user to install a water-blocking plate by himself or herself.

Also, since the water-blocking plate is provided to be able to be lifted and lowered according to a state of flooding, it is possible to appropriately cope with the site situation.

Various advantages and effects of the present disclosure are not limited to the above and should be more easily understood from the following description of detailed embodiments of the present disclosure.

DESCRIPTION OF SPECIFIC EMBODIMENTS OF THE INVENTION

Hereinafter, exemplary embodiments of the present disclosure will be described in detail with reference to the accompanying drawings.

However, the technical idea of the present disclosure is not limited to some embodiments described herein and may be implemented in various other forms. One or more elements of different embodiments may be selectively combined or substituted with elements of other embodiments within the scope of the technical idea of the present disclosure.

Also, unless clearly defined otherwise, terms including technical and scientific terms used in the embodiments of the present disclosure may be interpreted as having meanings generally understood by those of ordinary skill in the art to which the present disclosure pertains, and meanings of generally-used terms, such as terms defined in advance, may be interpreted in consideration of meanings in the context of the relevant art.

Also, the terms used in the embodiments of the present disclosure are only used to describe the embodiments and are not intended to limit the present disclosure.

In the specification, a singular expression may include a plural expression unless the context clearly indicates otherwise, and "at least one (or one or more) of A, B, and C" may include one or more of any possible combinations of A, B, and C.

Also, in describing elements of the embodiments of the present disclosure, terms such as first, second, A, B, (a), and (b) may be used.

The terms are only used to distinguish one element from another element, and the essence, order, sequence, or the like of the corresponding element is not limited by the terms.

In addition, when a certain element is described as being "connected," "coupled," or "linked" to another element, this not only includes a case in which the element is connected, coupled, or linked directly to the other element, but also includes a case in which the element is connected, coupled, or linked to the other element via another element disposed therebetween.

Also, when a certain element is described as being formed or disposed on (above) or under (below) another element, this not only includes a case in which the two elements come in direct contact with each other, but also includes a case in which one or more other elements are formed or disposed between the two elements. Also, the term "on (above) or under (below)" may indicate a downward direction as well as an upward direction with respect to one element.

Hereinafter, embodiments will be described in detail with reference to the accompanying drawings. The same or corresponding elements will be denoted by the same reference numerals throughout the drawings, and repeated description thereof will be omitted.

FIGS. 1 to 16 clearly illustrate only the major features of the present disclosure to allow clear understanding of the concept of the present disclosure, and thus may have not been drawn to scale or some elements may have been exaggerated. The scope of the present disclosure is not necessarily limited by specific shapes illustrated in the drawings.

Figure 1:
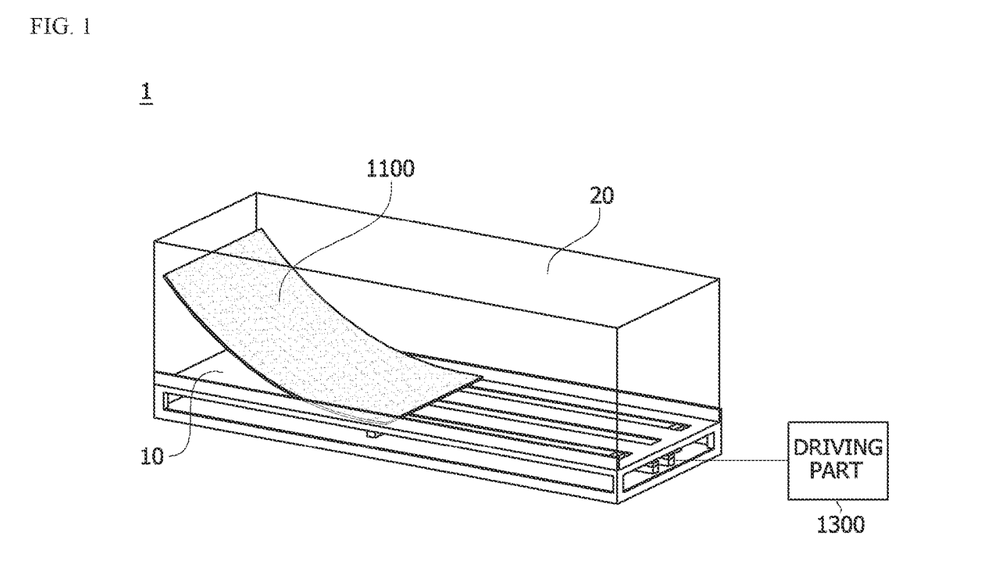
FIG. 1 is a perspective view illustrating a structure of a water-blocking device according to an embodiment of the present disclosure.
Figure 2:
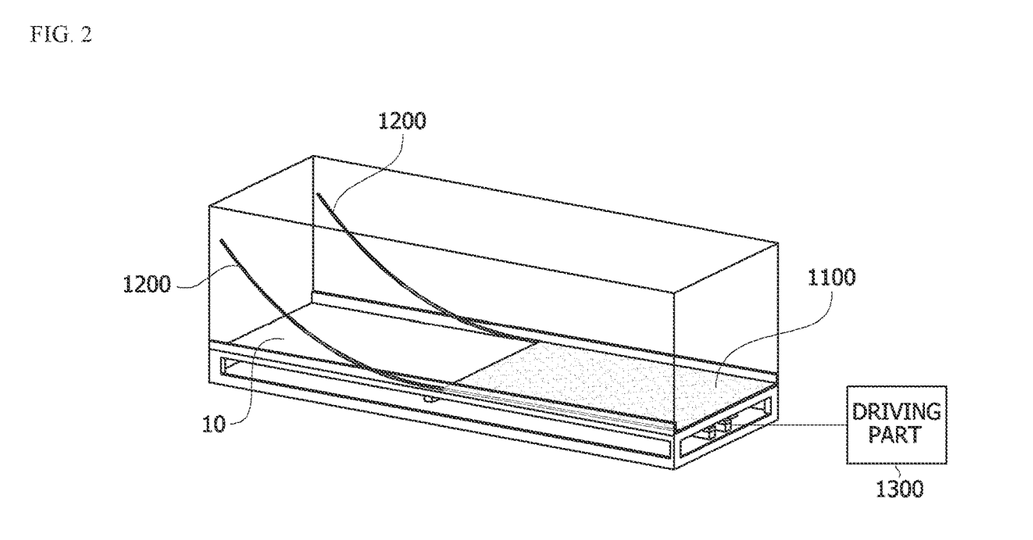
FIG. 2 is a view illustrating a detailed structure of FIG. 1.

FIG. 1 is a perspective view illustrating a structure of a water-blocking device according to an embodiment of the present disclosure, and FIG. 2 is a view illustrating a detailed structure of FIG. 1.

Referring to FIGS. 1 and 2, a water-blocking device 1 according to an embodiment of the present disclosure is a device configured to block water flowing into a building or a structure and may include a water-blocking plate 1100 installed on a floor 10 of a passage, rails installed on both sidewalls of the floor 10, and a driving part 1300 configured to lift and lower the water-blocking plate 1100, The water-blocking plate 1100 may be provided to have a plate structure and may be installed on the floor 10 of the passage of the structure. The conventional water-blocking plate 1100 has been provided to have a structure that moves down from a roof or have a structure that needs to be separately installed when flooding occurs. In order to address such inconvenience and to address a problem in terms of aesthetics, the water-blocking plate 1100 is installed on one region of the floor 10 according to the present disclosure.

In one embodiment, the water-blocking plate 1100 may be provided to have a structure that covers the floor 10 and may be made of a material having ductility when moving along the rail.

Guiderails 1200 may be installed on both sidewalls 20 of the floor 10 on which the water-blocking plate 1100 is installed and may serve as a guide along which the water-blocking plate 1100 is lifted and lowered.

The guiderails 1200 may be formed to come in contact with the floor 10 in which the water-blocking plate 1100 is installed so that the water-blocking plate 1100 may move along the guiderails 1200 when the driving part 1300 is driven. In one embodiment, the guiderails 1200 may be formed as a groove structure into which the water-blocking plate 1100 is inserted.

Also, the guiderails 1200 may be formed in a curved shape. In this way, in a case in which a water-blocking wall is lifted and lowered, the water-blocking plate 1100 may be lifted along the curved shape to prevent damage to the water-blocking plate 1100.

The driving part 1300 may be connected to the water-blocking plate 1100 and lift or lower the water-blocking plate 1100.

The driving part 1300 may be connected to one side of the water-blocking plate 1100 and lift or lower the water-blocking plate 1100. The driving part 1300 may be arranged in two different ways.

First, the driving part 1300 may be provided as a structure that is disposed at a lower portion of the water-blocking plate 1100 to push the water-blocking plate 1100 upward. In this case, in consideration of aesthetics, the driving part 1300 may be provided as a structure that is inserted into the floor 10.

Second, the driving part 130 may be provided as a structure that is disposed at an upper portion of the water-blocking plate 1100 to pull the water-blocking plate 1100 upward. In this case, the driving part 1300 may be disposed as a structure inserted into the sidewall 20 and may be connected to a side surface of the water-blocking plate 1100 to lift and lower the water-blocking plate 1100. Here, in order to lift and lower the water-blocking plate 1100 stably, the driving part 1300 may be provided as a pair of driving parts 1300, and each driving part 1300 may be disposed at one of the both sidewalls 20.

Figure 3:
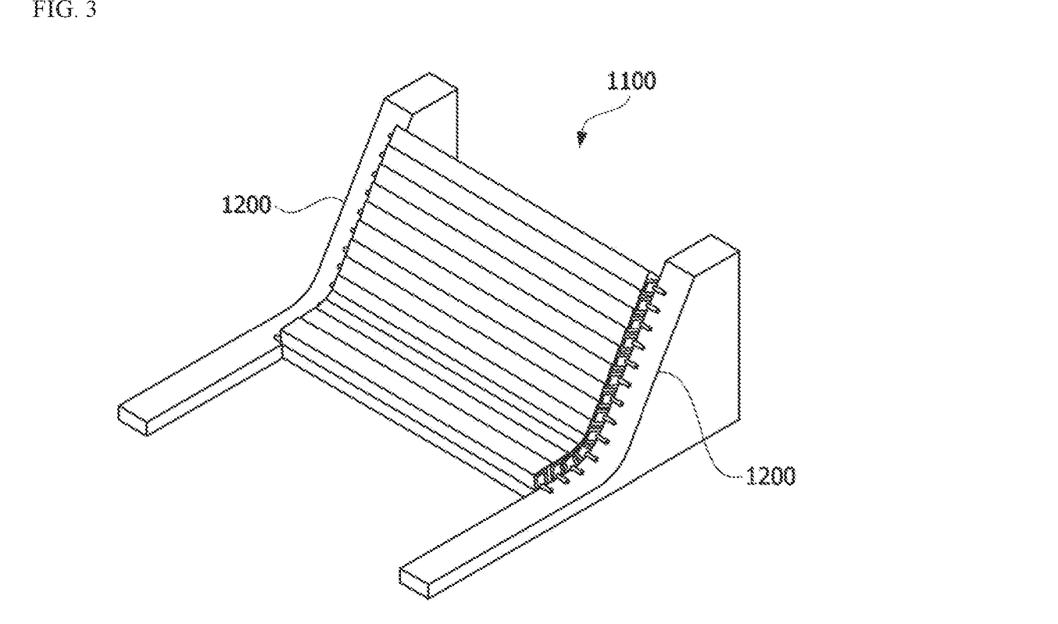
FIG. 3 is a view illustrating a structure of a water-blocking device according to another embodiment of the present disclosure.
Figure 4:
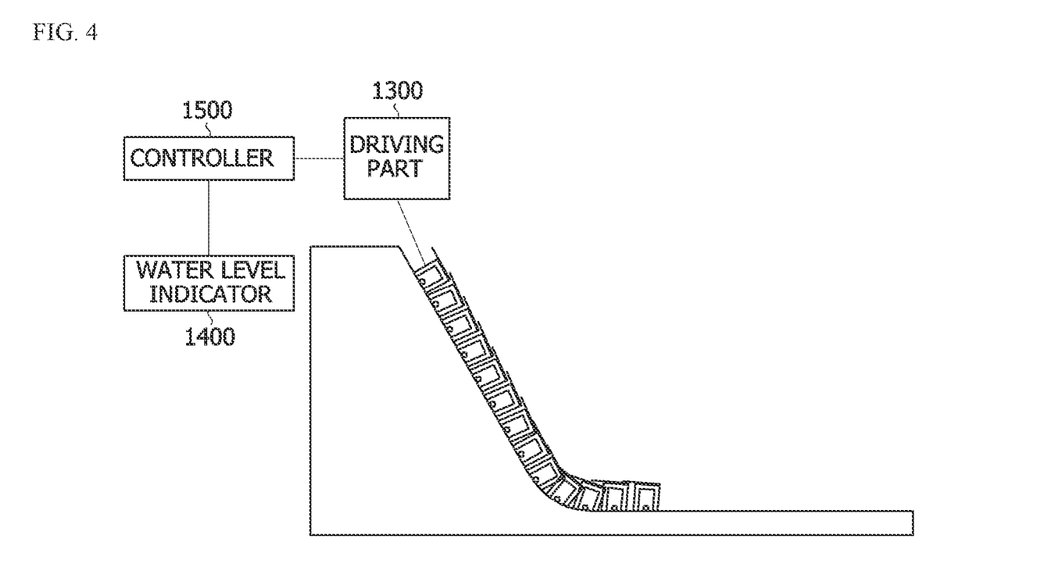
FIG. 4 is a view illustrating driving of FIG. 3.

FIG. 3 is a view illustrating a structure of the water-blocking device 1 according to another embodiment of the present disclosure, and FIG. 4 is a view illustrating driving of FIG. 3.

Referring to FIGS. 3 and 4, the water-blocking device 1 according to the embodiment of the present disclosure may include a water level indicator 1400 and a controller 1500.

The water level indicator 1400 may be installed in the vicinity of the water-blocking device 1 and may measure the level of water flowing into the structure and transmit the measured level to the controller 1500.

In this case, the controller 1500 may receive information on the water level sensed by the water level indicator 1400 and control the operation of the driving part 1300 to control the height of the water-blocking plate 1100.

The conventional water-blocking plate 1100 is provided as a structure that blocks the sidewall 20. However, such a structure has a problem in that it makes it impossible for people to move. In the present disclosure, the height of the water-blocking plate 1100 is automatically controlled according to the water level to allow people to move over the water-blocking plate 1100 at an early stage of flooding.

Also, the water-blocking plate 1100 may be provided as a structure in which a plurality of support frames 1110 are connected.

Although it is possible to withstand a water pressure with a single plate structure when a passageway on which the water-blocking device 1 is installed is narrow, it is not possible to withstand a water pressure with a single plate structure when the passageway is wide.

The water-blocking plate 1100 according to the present disclosure may be provided as a structure in which the plurality of support frames 1110 are connected. In this way, the support frames 1110 may simultaneously withstand the water pressure and serve as the water-blocking plate 1100.

A connection structure of the support frames 1110 will be described in detail below.

Figure 5:
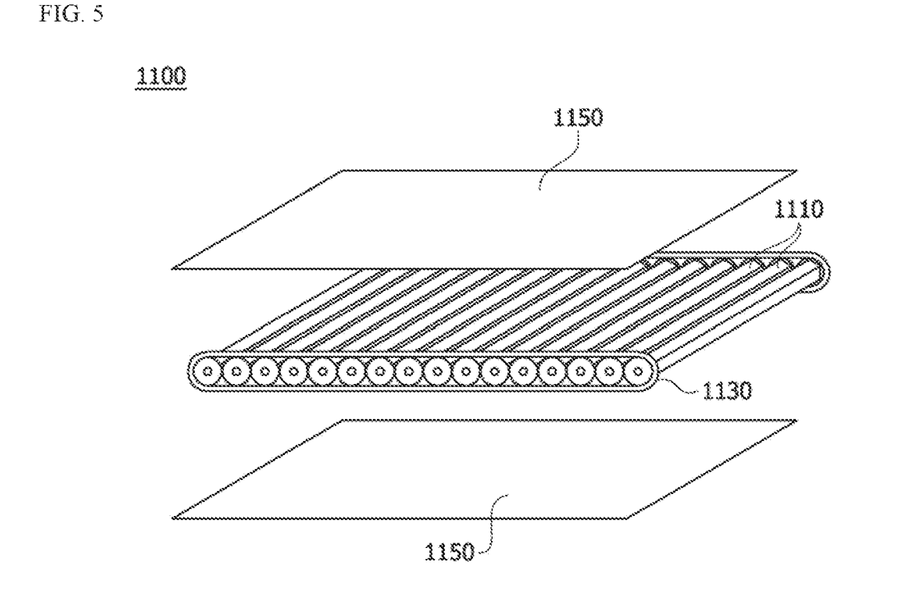
FIG. 5 is a view illustrating a coupling structure of a water-blocking plate.
Figure 6:
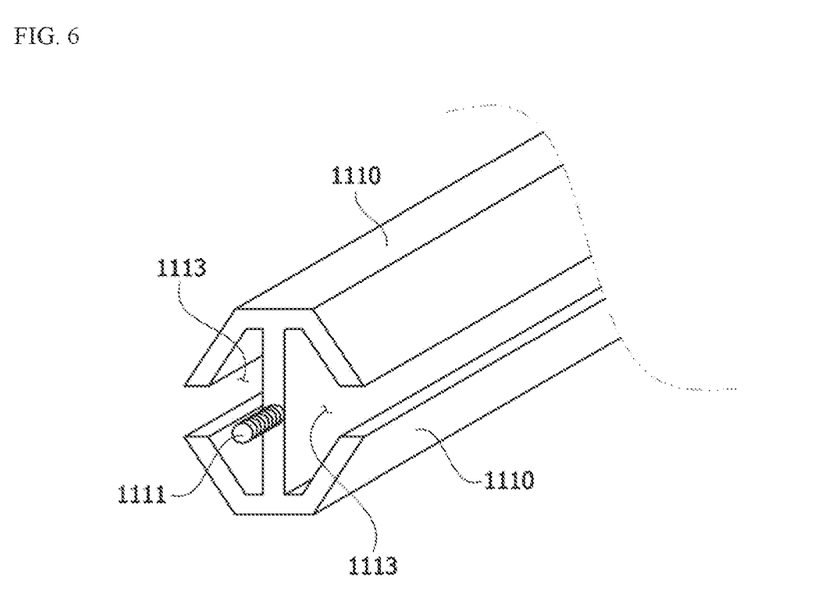
FIG. 6 is a view illustrating a structure of a support frame.
Figure 7:
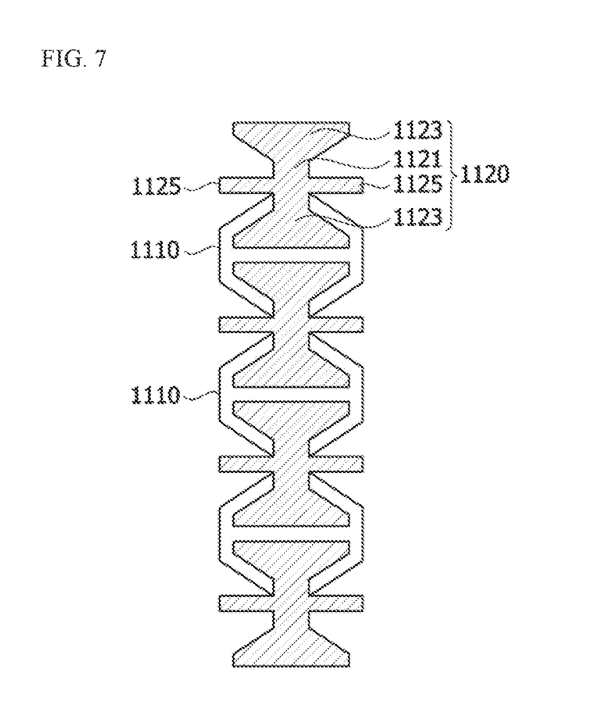
FIG. 7 is a view illustrating a detailed structure of the water-blocking plate of FIG. 5.

FIG. 5 is a view illustrating a coupling structure of the water-blocking plate 1100, FIG. 6 is a view illustrating a structure of the support frame 1110, and FIG. 7 is a view illustrating a detailed structure of the water-blocking plate 1100 of FIG. 5.

Referring to FIGS. 5 to 7, the water-blocking plate 1100 may be provided as the structure in which the plurality of support frames 1110 are connected.

The support frame 1110 may include a coupling part 1111 that protrudes in an axial direction, and the coupling part 1111 may be connected through a chain.

The support frame 1110 may be provided in the shape of a column, and both side end portions of the support frame 1110 may be inserted into the guiderail 1200. In one embodiment, a main body of the support frame 1110 may be made of a metal material to withstand water pressure, and the support frame 1110 may have a circular cross-section or may be disposed to be spaced a predetermined distance apart from a neighboring support frame 1110 so as to be movable along the guiderail 1200.

The coupling part 1111 may be provided as a structure that protrudes in the axial direction from an end portion of the main body and may be coupled using a chain. A method of fixing the coupling part 1111 is not limited, and various other method such as screw coupling may also be used to fix the coupling part 1111.

The coupling part 1111 may be inserted and coupled to the chain, and the driving part 1300 may be connected to one side of the chain to lift and lower the water-blocking plate 1100.

The support frames 1110 may be connected through connecting parts 1120 made of an elastic material.

In one embodiment, the support frame 1110 may have a pair of insertion holes 1113 provided therein to face each other, and the connecting part 1120 may have a pair of insertion parts 1123 inserted into the insertion holes 1113.

The insertion parts 1123 may be connected through a connection body 1121 and may be disposed at both side end portions of the connection body 1121 to be inserted into different support frames 1110.

Also, the insertion parts 1123 may be provided to have a thickness greater than that of the connection body 1121 to prevent detachment of the insertion parts 1123 from the support frames 1110. The insertion parts 1123 may be disposed to be coupled in the axial direction and face each other with respect to a central portion of the support frame 1110.

The support frames 1110 and the connection parts 1120 may be alternately coupled to form the water-blocking plate 1100.

At least one protruding part 1125 may be provided between the insertion parts 1123 of the connecting part 1120. The protruding part 1125 may be disposed between the support frames 1110 and prevent direct contact therebetween. When the support frames 1110 are bent, a tensile force may act on one side of the protruding part 1125, and a compressive force may act on the other side thereof.

The support frames 1110 disposed to be inserted to face the protruding part 1125 may have an inclined or curved surface. The support frames 1110 may have an inclined or curved structure to provide a space in which the water-blocking plate 1100 may be bent when being lifted or lowered along the guiderails 1200.

A waterproof member 1150 may be connected to one surface of the support frame 1110. A method of coupling the waterproof member 1150 is not limited, and various method such as bonding or screw coupling may be used to couple the waterproof member 1150. The waterproof member 1150 may be connected to one surface of the water-blocking plate 1100 to prevent leakage of water and may prevent inconvenience caused to people passing by when the support frames 1110 are disposed on the floor 10.

Also, the waterproof member 1150 may prevent foreign matter from entering and interfering with the actual operation when the support frames 1110 are disposed on the floor 10 at ordinary times.

Figure 8:
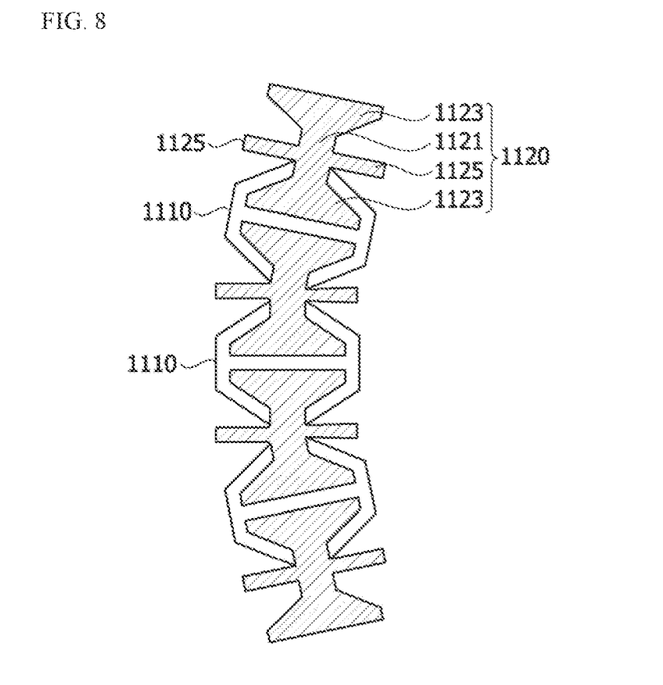
FIG. 8 is a view illustrating operation of the water-blocking plate.

FIG. 8 is a view illustrating operation of the water-blocking plate 1100.

Referring to FIG. 8, when the water-blocking plate 1100 is lifted and lowered along the guiderail 1200, the water-blocking plate 1100 is bent along the curvature of the guiderail 1200. Here, as a tensile force acts on one side of the connecting part 1120 and a compressive force acts on the other side thereof, an adhesive force of the support frames 1110 may be increased and thus watertightness may be increased.

Also, when the water-blocking plate 1100 stops after being lifted, a pressure acting downward increases due to a self-weight of the support frames 1110, and thus watertightness may be increased naturally.

Figure 9:
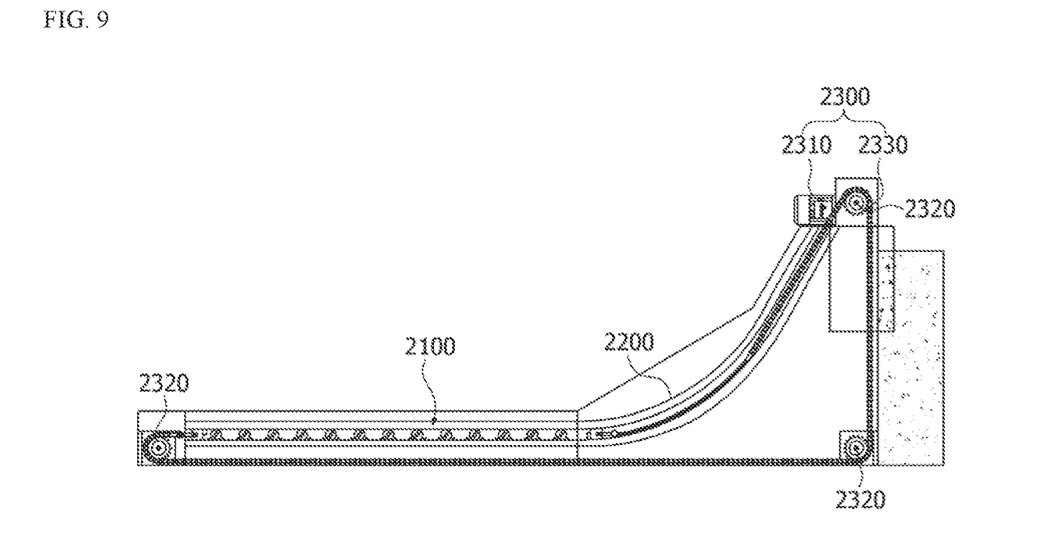
FIG. 9 is a lateral view of a water-blocking device according to still another embodiment of the present disclosure.
Figure 10:
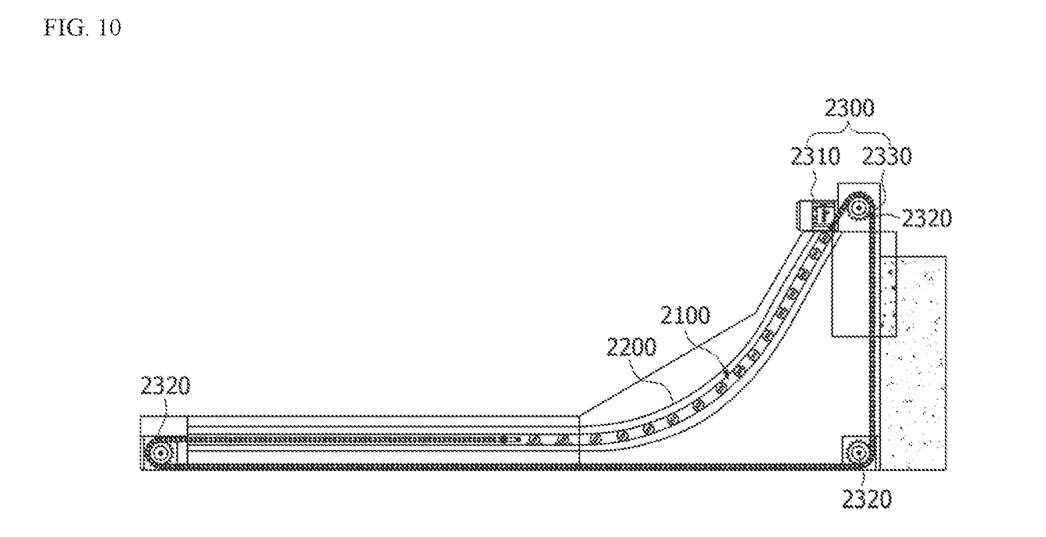
FIG. 10 is a view illustrating an operational state of FIG. 9.

FIG. 9 is a lateral view of a water-blocking device according to still another embodiment of the present disclosure, and FIG. 10 is a view illustrating an operational state of FIG. 9.

Referring to FIGS. 9 and 10, a water-blocking device using an elastic member 2130 according to still another embodiment of the present disclosure may include a water-blocking plate 2100, a guide part 2200, and a driving part 2300.

The water-blocking plate 2100 may be disposed on a floor and move upward and downward due to operation of the driving part 2300. Here, the water-blocking plate 2100 may be linked to a water level sensor to move according to the sensed water level, and the height of the water-blocking plate 2100 may be controlled according to the water level.

The water-blocking plate 2100 may be disposed to be inserted into an insertion groove 2160 formed in the floor. The water-blocking plate 2100 may not be exposed to the outside at ordinary times and then move from the insertion groove 2160 to protrude upward.

The water-blocking plate 2100 may include a body part 2110 in which a plurality of plates 2111 are rotatably connected and the elastic member 2130 disposed to surround an outer side surface of the body part 2110.

The body part 2110 may form the basic framework of the water-blocking plate 2100 and may be made of a metal material to withstand water pressure. The body part 2110 may be provided as a structure in which the plurality of plates 2111 are coupled and may have a predetermined thickness to withstand water pressure. The body part 2110 may include a structure configured to withstand water pressure, and a reinforcing member (not illustrated) may be additionally disposed in the body part 2110 to increase a support force or resist bending.

Also, the body part 2110 may include a rotatable connection structure to rotate along the guide part 2200.

The elastic member 2130 may be provided to surround the outer side surface of the body part 2110. The elastic member 2130 may seal a space formed in the connection structure of the plates 2111 to prevent water leakage and improve watertightness when flooding occurs.

Also, the elastic member 2130 may absorb impact applied to the body part 2110 to prevent damage to the body part 2110 and may prevent unexpected water leakage that may occur during flooding.

The guide part 2200 may guide movement of the water-blocking plate 2100. The guide part 2200 may be disposed at both sides of the water-blocking plate 2100 to stably guide the water-blocking plate 2100.

In one embodiment, the guide part 2200 may be provided as a groove structure in a structure, such as a wall of a building, that may support the water-blocking plate 2100, and may guide the water-blocking plate 2100 to be lifted and lowered along the guide part 2200 in a state in which one region of the water-blocking plate 2100 is inserted thereinto.

The guide part 2200 may include a curved region to allow the water-blocking plate 2100, which is installed on the floor, to be lifted and lowered naturally. Here, the water-blocking plate 2100 that is lifted along the guide part 2200 may be disposed to have a slope.

The driving part 2300 may move the water-blocking plate 2100 along the guide part 2200. The driving part 2300 may include a driving motor 2310 and a connecting part 2330 connected to the driving motor 2310 to lift and lower the water-blocking plate 2100.

The driving motor 2310 may be connected to the water-blocking plate 2100 to lift the water-blocking plate 2100 when flooding occurs and to lower the water-blocking plate 2100 when it is not necessary to block water. The driving motor 2310 may rotate in forward and reverse directions according to a direction of current to control movement of the water-blocking plate 2100.

The connecting part 2330 may be connected to the driving motor 2310 to lift and lower the water-blocking plate 2100.

In the present disclosure, the connecting part 2330 may have one side connected to one side of the water-blocking plate 2100 and the other side connected to the other side of the water-blocking plate 2100 to form a closed loop structure and may be disposed along a sidewall along which the guide part 2200 is disposed. In one embodiment, the connecting part 2330 may have a chain structure. The movement of the connecting part 2330 having the chain structure may be guided through a plurality of rollers 2320, and positions of the rollers 2320 may be controlled according to a path of chain movement.

Figure 11:
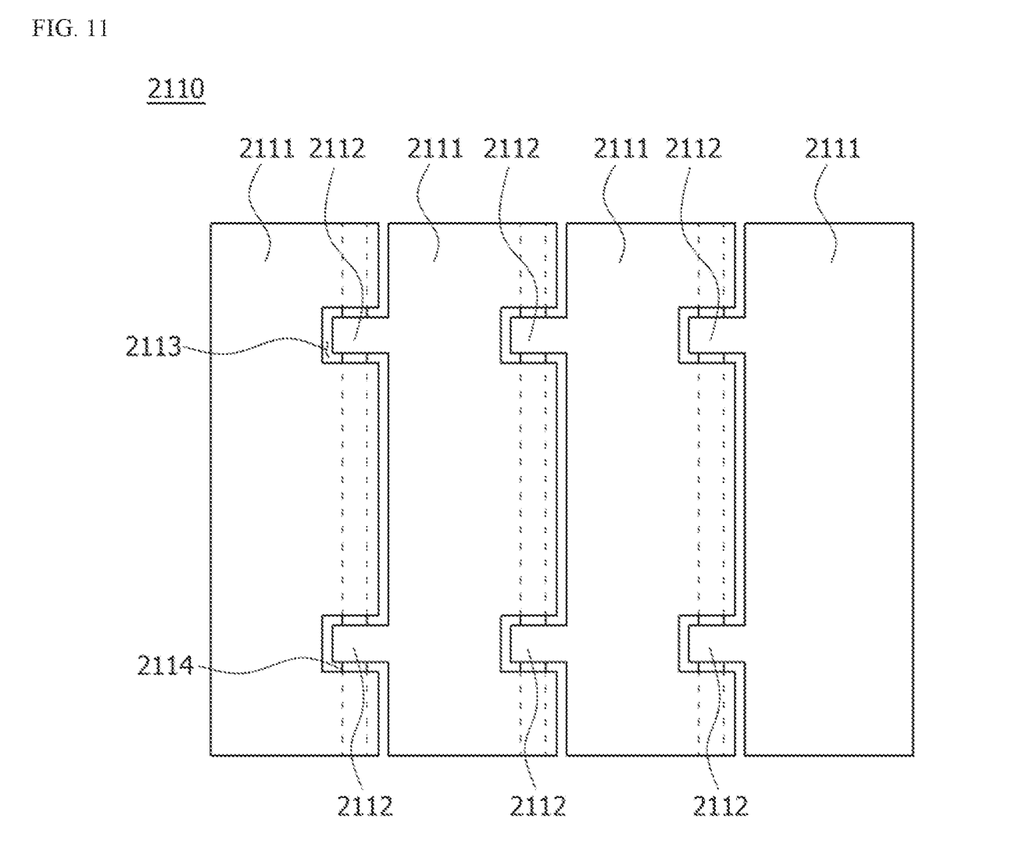
FIG. 11 is a view illustrating a structure of a body part, which is an element of FIG. 9.
Figure 12:
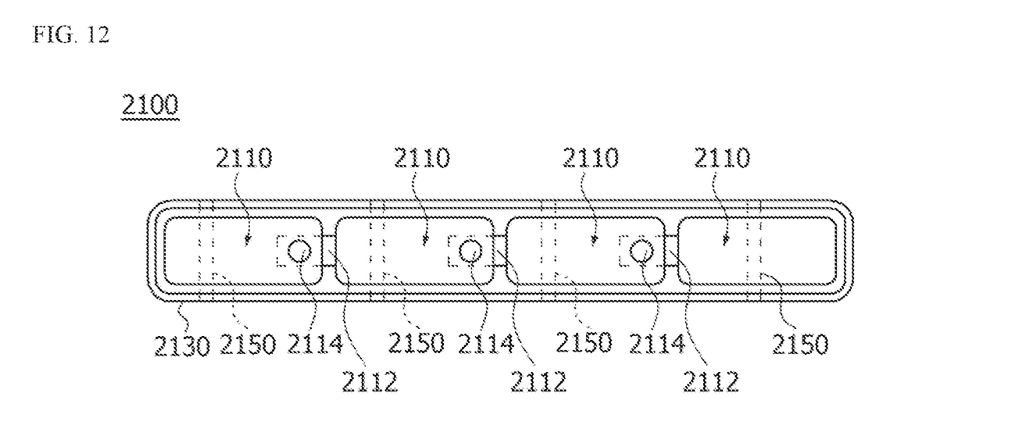
FIG. 12 is a view illustrating a structure of a water-blocking plate, which is an element of FIG. 9.

FIG. 11 is a view illustrating a structure of the body part 2110, which is an element of FIG. 9, and FIG. 12 is a view illustrating a structure of the water-blocking plate 2100, which is an element of FIG. 9.

Referring to FIGS. 11 and 12, the body part 2110 may have a structure in which the plurality of plates 2111 are rotatably connected.

The plate 2111 may include at least two or more groove parts 2113 and at least two or more protrusion parts 2112. Here, the protrusion parts 2112 of the plate 2111 may be disposed in the groove parts 2113 of a neighboring plate 2111, and the body part 2110 may include a rotating shaft 2114 that pass through the protrusion parts 2112 and the plate 2111 having the groove parts 2113 formed therein.

Here, the plates 2111 connected through the groove parts 2113 and the protrusion parts 2112 may be slightly spaced apart from each other. In this way, when the body part 2110 rotates about the rotating shaft 2114, contact between the neighboring plates 2111 may be prevented. Water leakage that may occur through the space between the plates 2111 may be addressed by the elastic member 2130. In one embodiment, end corners of the plates 2111 may have a curved structure and prevent collision between the neighboring plates 2111.

The number of groove parts 21133 and the number of protrusion parts 2112 are not limited to those shown in FIG. 11 and may be changed when necessary.

Also, the water-blocking plate 2100 may include the elastic member 2130 configured to surround the outer side of the body part 2110. The elastic member 2130 may be disposed to surround the body part 2110 in a direction in which the plurality of plates 2111 are connected.

When the water-blocking plate 2100 is lifted and lowered, the elastic member 2130 disposed at a lower portion of the body part 2110 is stretched, and the elastic member 2130 disposed at an upper portion thereof is compressed. When elongation and contraction are repeated in this way, contact surfaces between the elastic member 2130 and the body part 2110 may be separated. In order to prevent such a problem, the elastic member 2130 and the body part 2110 may be coupled to each other through a coupling part 2150.

The coupling part 2150 is a component configured to couple the elastic member 2130 and the body part 2110 to each other, and various known components that are able to couple two different elements to each other may be used as the coupling part 2150.

Figure 13:
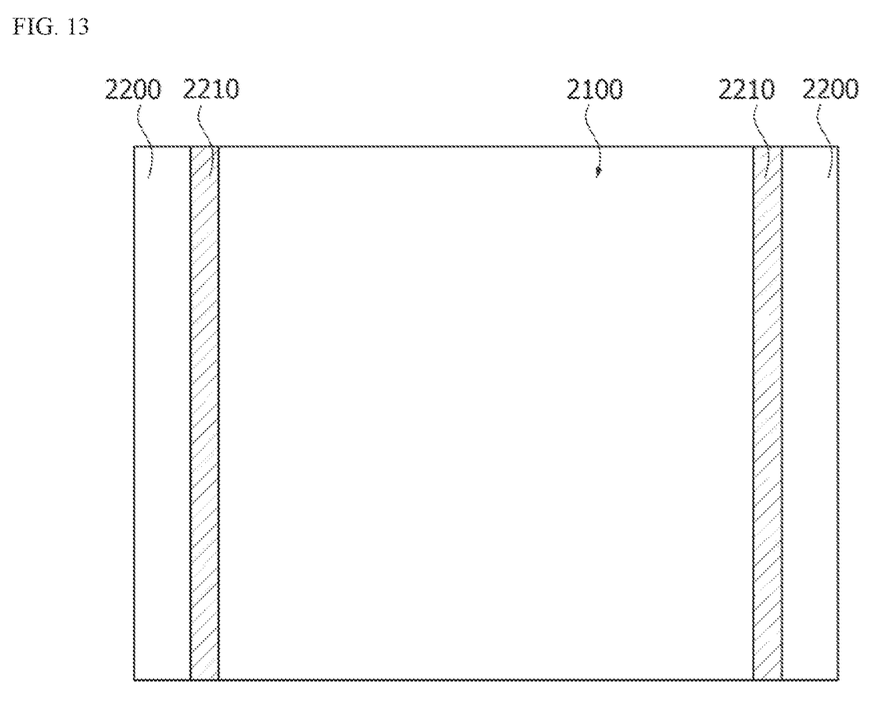
FIG. 13 is a front view of FIG. 9.

FIG. 13 is a front view of FIG. 9.

Referring to FIG. 13, the guide part 2200 may be provided as a pair of groove structures that face each other to allow the water-blocking plate 2100 to move while both side end portions thereof are inserted into the guide parts 2200. A sealing member 2210 may be provided at an end portion of each guide part 2200.

The guide parts 2200 simultaneously support both side end portions of the water-blocking plate 2100 and guide movement thereof. Here, a space is formed between the guide part 2200 and the water-blocking plate 2100 to allow movement of the water-blocking plate 2100, and there is concern that water leakage may occur through the space during flooding.

The sealing member 2210 may be disposed at the end portion of each guide part 2200 to prevent water leakage during flooding.

In one embodiment, the sealing member 2210 may be disposed so that one side is fixed to the end portion of the guide part 2200 and the other side has a free end structure. That is, the sealing member 2210 may have one side fixed to the guide part 2200 that is provided as a groove structure and may have the other side provided as a free end structure that does not come in contact with the water-blocking plate. Fixing the water-blocking plate 2100 through the sealing member 2210 is the most effective in sealing between the water-blocking plate 2100 and the guide part 2200. However, the water-blocking plate 2100 according to the present disclosure has a structure that is disposed on the floor at ordinary times and is lifted and lowered during flooding and thus is not able to be sealed in a fixed state.

Therefore, the sealing member 2210 according to the present disclosure has one side fixed to the guide part 2200 and the other side provided in the form of a free end so as not to interfere with lifting and lowering of the water-blocking plate 2100. In this way, when the water-blocking plate 2100 is lifted and flooding occurs, the sealing member 2210 may form a watertight structure through water pressure.

Figure 14:
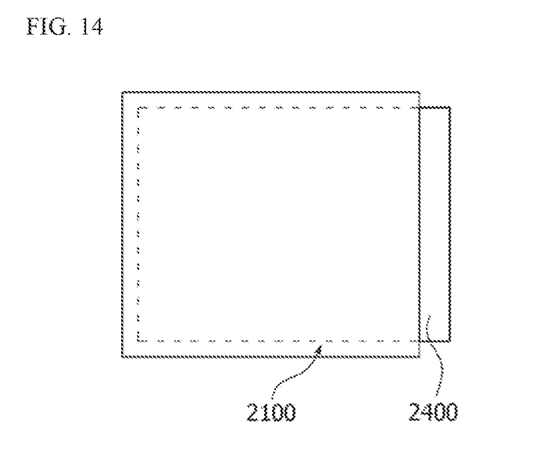
FIG. 14 is a view illustrating a state in which the water-blocking device of FIG. 9 is installed on a floor.
Figure 15:
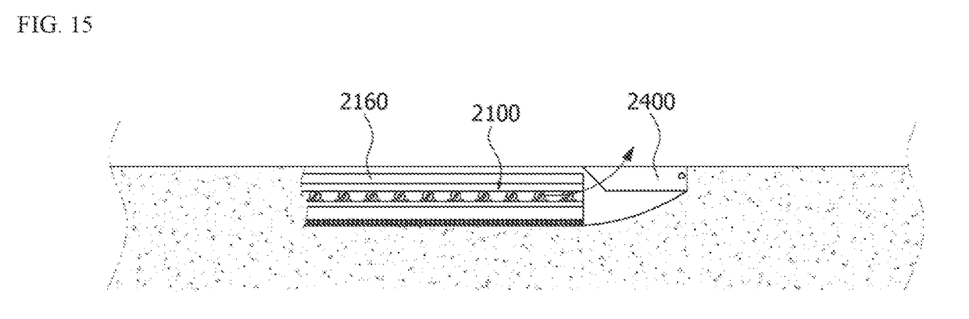
FIG. 15 is a view illustrating an arrangement structure with an opening-closing part when the water-blocking device of FIG. 9 is disposed on the floor.
Figure 16:
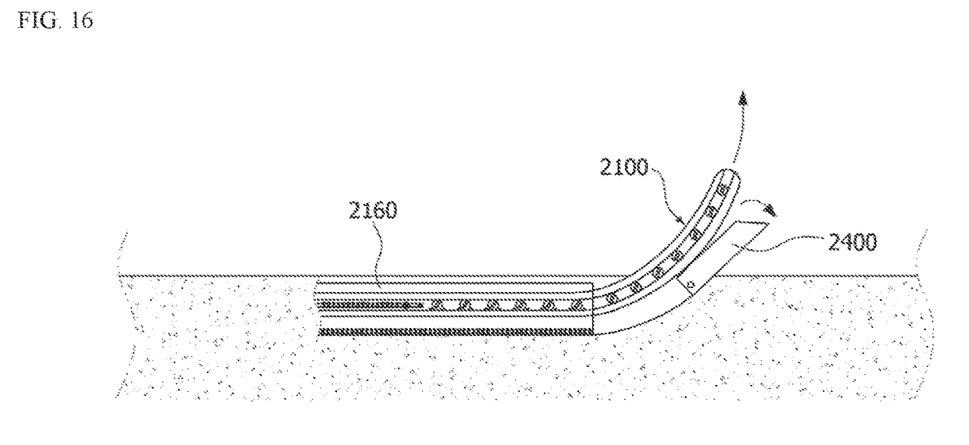
FIG. 16 is a view illustrating an operational structure of the opening-closing part of FIG. 15.

FIG. 14 is a view illustrating a state in which the water-blocking device of FIG. 9 is installed on a floor, FIG. 15 is a view illustrating an arrangement structure with an opening-closing part 2400 when the water-blocking device of FIG. 9 is disposed on the floor, and FIG. 16 is a view illustrating an operational structure of the opening-closing part 2400 of FIG. 15.

Referring to FIGS. 14 to 16, the water-blocking plate 2100 according to an embodiment of the present disclosure may be disposed in the insertion groove 2160 formed in the floor.

At ordinary times, the water-blocking plate 2100 may be disposed to be inserted into the insertion groove 2160 formed in the floor so as not to interfere with movement of people passing by. However, in a case in which an end portion of the insertion groove 2160, that is, an entrance to the insertion groove 2160 that is formed in the floor, is present in an open state, the entrance may be blocked by garbage or other foreign matter, and thus the water-blocking plate 2100 may be unable to move.

In order to prevent such a problem, the opening-closing part 2400 that is rotatable may be provided at the end portion of the insertion groove 2160.

The opening-closing part 2400 may rotate due to having one side connected through a hinge structure. At ordinary times, the opening-closing part 2400 may cover the end portion of the insertion groove 2160 to prevent entry of foreign matter or accidents of people passing by. When the water-blocking plate 2100 is lifted, the opening-closing part 2400 may be automatically opened due to being pushed by the water-blocking plate 2100.

In one embodiment, an end portion of the opening-closing part 2400 may have an inclined or curved structure.

When the water-blocking plate 2100 that has the shape of a flat plate and is present inside the insertion groove 2160 is lifted, the water-blocking plate 2100 comes in contact with one region of the opening-closing part 2400. The end portion of the opening-closing part 2400 may be provided to have an inclined or curved structure to facilitate rotation of the water-blocking plate 2100 when in contact with the water-blocking plate 2100.

In this way, the water-blocking device using the elastic member 2130 according to an embodiment of the present disclosure may block water even without requiring a user to install the water-blocking plate 2100 by himself or herself, and since the water-blocking plate 2100 is provided to be able to be lifted and lowered according to a state of flooding, it is possible to appropriately cope with the site situation.

Also, at ordinary times, the elastic member 2130 absorbs impact on the water-blocking device and thus increases durability thereof. In this way, unexpected water leakage during flooding may be prevented.

The exemplary embodiments of the present disclosure have been described above with reference to the accompanying drawings.

The above description is merely illustrative of the technical idea of the present disclosure, and those of ordinary skill in the art to which the present disclosure pertains should be able to make various modifications, changes, and substitutions within the scope not departing from the essential features of the present disclosure. Therefore, the embodiments disclosed herein and the accompanying drawings are only for describing, instead of limiting, the technical idea of the present disclosure, and the scope of the technical idea of the present disclosure is not limited by the embodiments and the accompanying drawings. The scope of the present disclosure should be interpreted by the claims below, and all technical ideas within the scope equivalent to the claims should be interpreted as falling within the scope of the present disclosure.

DESCRIPTION OF REFERENCE NUMERALS

1: water-blocking device, 10: floor, 20: sidewall, 1100: water-blocking plate, 1110: support frame, 1111: coupling part, 1113: insertion hole, 1120: connecting part, 1121: connection body, 1123: insertion part, 1125: protruding part, 1150: waterproof member, 1200: guiderail, 1300: driving part, 1400: water level indicator, 1500: controller, 2100: water-blocking plate, 2110: body part, 2111: plate, 2112: protrusion part, 2113: groove part, 2114: rotating shaft, 2130: elastic member, 2150: coupling part, 2160: insertion groove, 2200: guide part, 2210: sealing member, 2300: driving part, 2310: driving motor, 2320: roller, 2330: connecting part, 2400: opening-closing part

What is claimed is:

1. A water-blocking device comprising:
    a water-blocking plate installed in the same direction as a direction of a floor of a passage;
    rails that have a curved region and are installed on both sidewalls of the floor; and
    a driving part configured to lift and lower the water-blocking plate,
    wherein the water-blocking plate includes a plurality of support frames disposed to be spaced apart from each other,
    a waterproof member is connected to one surface of the plurality of support frames, and
    when the driving part is operated, the water-blocking plate is lifted and lowered while being bent along the rails.

2. The water-blocking device of claim 1, wherein the driving part is installed on the floor or the sidewall.

3. The water-blocking device of claim 1, further comprising:
    a water level indicator configured to sense a water level; and
    a controller configured to receive information on the water level sensed by the water level indicator and control an operation of the driving part to control a height of the water-blocking plate.

4. The water-blocking device of claim 1, the support frame includes a coupling part that protrudes in an axial direction, and the coupling part is connected through a chain.

5. The water-blocking device of claim 1, wherein the support frame is connected through a connecting part made of an elastic material.

6. The water-blocking device of claim 5, wherein:
    the support frame has a pair of insertion holes formed therein to face each other; and
    the connecting part has a connecting body and insertion parts that are inserted into the insertion holes and disposed at each end portion of the connecting body to be inserted into different support frames.

7. The water-blocking device of claim 6, wherein at least one protruding part is provided between the insertion parts of the connecting part.

8. The water-blocking device of claim 7, wherein the support frame disposed to face the protruding part has an inclined or curved surface.

9. A water-blocking device comprising:
    a water-blocking plate disposed in the same direction as a direction of a floor;
    a guide part that has a curved region to guide movement of the water-blocking plate; and
    a driving part configured to move the water-blocking plate along the guide part,
    wherein the water-blocking plate includes a body part in which a plurality of plates are rotatably connected and an elastic member disposed to surround an outer side surface of the body part,
    the guide part is provided as a pair of groove structures that face each other,
    a sealing member having a free end structure is disposed at an end portion of the guide part so that one side of the sealing member is connected thereto in a longitudinal direction of the guide part, and when flooding occurs, the sealing member forms a watertight structure through a water pressure.

10. The water-blocking device of claim 9, wherein:

the body part is formed by connection of the plates that each include at least two or more groove parts and at least two or more protrusion parts;

the protrusion parts of the plate are disposed in the groove parts of a neighboring plate; and the body part includes a rotating shaft that passes through the protrusion parts and the plate having the groove parts formed therein.

11. The water-blocking device of claim 9, wherein the driving part includes a driving motor and a connecting part connected to the driving motor to lift and lower the water-blocking plate.

12. The water-blocking device of claim 9, wherein the water-blocking plate is disposed to be inserted into an insertion groove formed in the floor and is lifted and lowered through driving of the driving part.

13. The water-blocking device of claim 12, wherein an opening-closing part that is rotatable is provided at an end portion of the insertion groove.

14. The water-blocking device of claim 13, wherein an end portion of the opening-closing part has an inclined or curved structure.

15. The water-blocking device of claim 9, wherein the body part and the elastic member are coupled through a coupling part.

* * * * *